United States Patent [19]
Chao et al.

[11] 3,767,900
[45] Oct. 23, 1973

[54] ADAPTIVE CONTROLLER HAVING OPTIMAL FILTERING

[75] Inventors: Henry H. Chao; Michael G. Horner, both of Wisconsin Rapids, Wis.

[73] Assignee: Consolidated Papers, Inc., Wisconsin Rapids, Wis.

[22] Filed: June 23, 1971

[21] Appl. No.: 155,739

[52] U.S. Cl............. 235/151.1, 235/150.1, 162/253
[51] Int. Cl. .......................................... G05b 13/02
[58] Field of Search...................... 235/150.1, 151.1; 162/252, 253

[56] References Cited
UNITED STATES PATENTS
3,687,802   8/1972   Rummel et al. ............. 235/151.3 X
3,619,360   11/1971   Persik, Jr...................... 235/151.1 X Primary Examiner—Eugene G. Botz
Attorney—Lee J. Gary et al.

[57] ABSTRACT

A self-adaptive controller for use in a control process for providing ordered changes in a manipulated process variable in response to measured changes in a controlled process variable having means for using measured and predicted values of the controlled variable to obtain an estimated value of the controlled variable which estimated value is used via a self-adaptive controller to determine the change in manipulated variable. The controller is described with reference to a paper manufacturing process for controlling the basis weight and moisture content of a continuous web of paper.

28 Claims, 10 Drawing Figures

INVENTORS
HENRY CHAO
MICHAEL G. HORNER

BY Gary, Juettner, Pigott & Cullinan ATTYS.

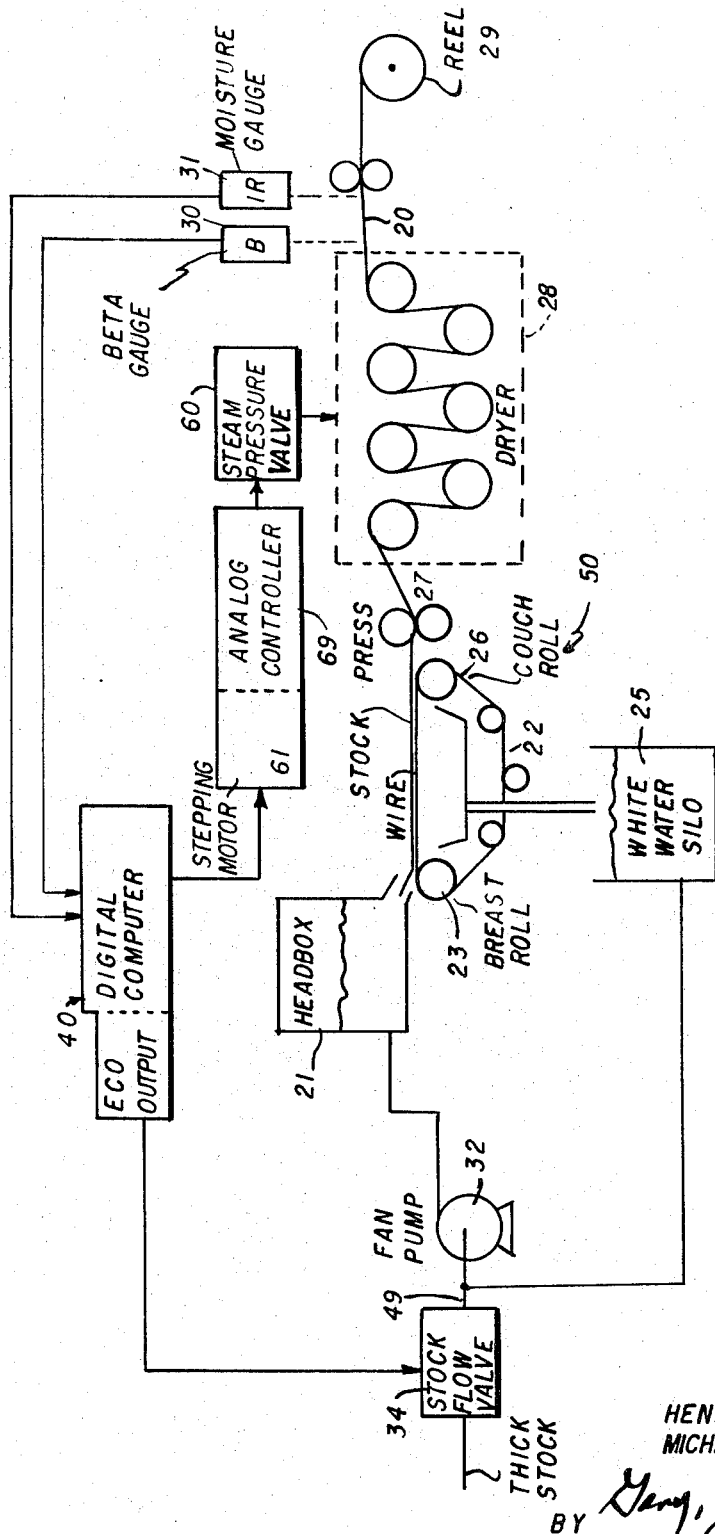

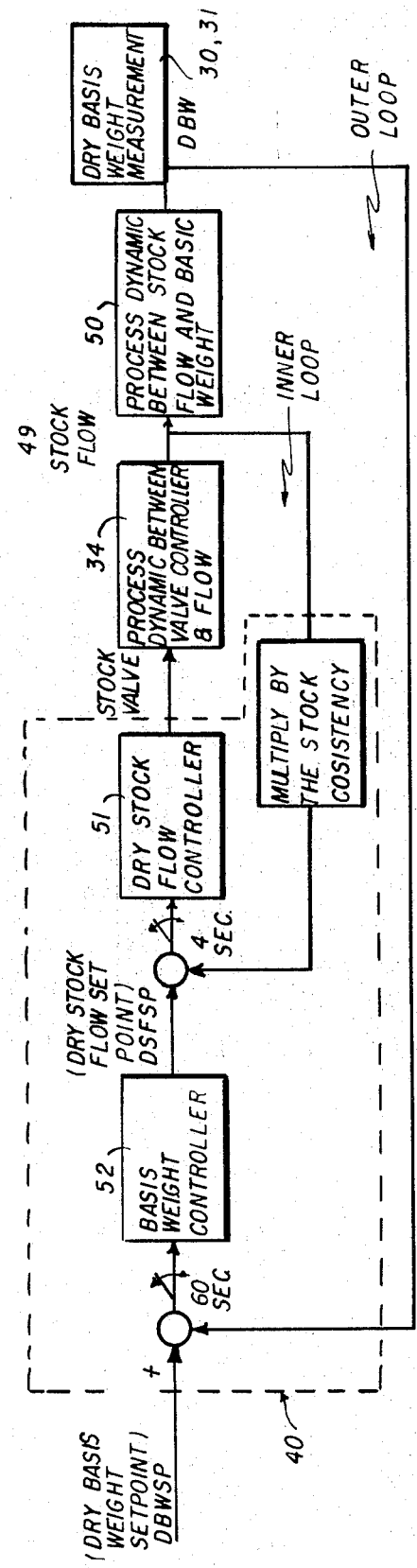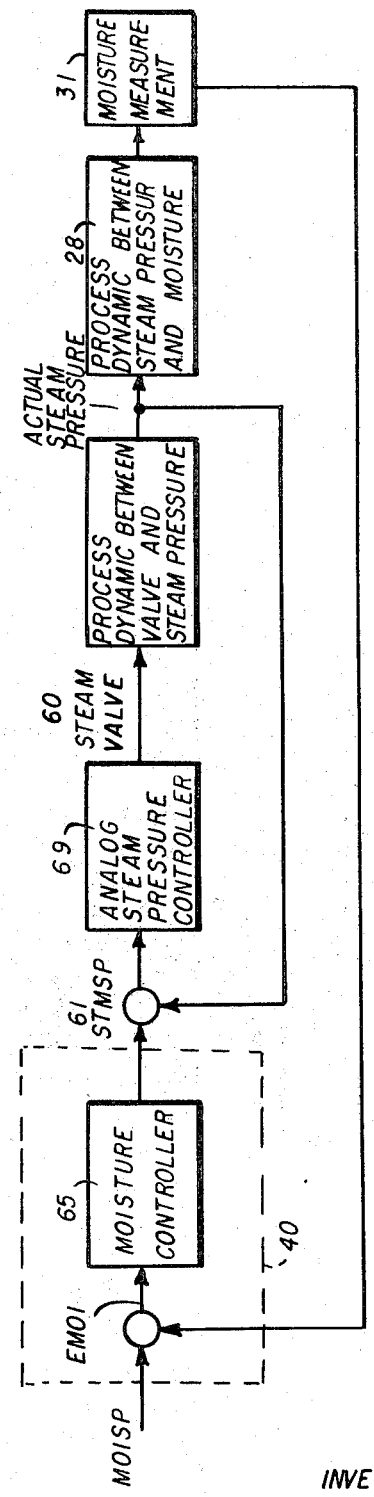

ADAPTIVE CONTROLLER HAVING OPTIMAL FILTERING

BACKGROUND OF THE INVENTION

1. Field of the Invention

This invention relates to process control systems, and more particularly to a self-adaptive controller for such systems which provides analog or digital control signals to effect a desired response based upon a given process model.

2. Description of the Prior Art

The availability of real time computers for application in the process control field has made the implementation of sophisticated digital process controllers both possible and practical. However, such process controllers have not been applied to process control on a large scale.

More specifically, as a result of the complex nature of many physical processes, it is difficult to define relationships between variables of the process so as to permit control of the process operations to be relinquished to a digital computer. For purposes of analysis or control of a process, the process dynamics must be inentified by identified mathematical model in the form of an equation or algorithm which defines a functional relationship between a controlled variable and a manipulated variable in the process control loop. The mathematical model must account for variations such as changes in ambient conditions, changes in operating conditions of apparatus, tolerances in materials used, etc.

In many processes, it is impractical to obtain a detailed model for each control loop because the processes cannot be adequately modeled using analytical methods. Therefore, in such cases, process identification is a necessary step in building an empirical mathematical model. The usual approach for process identification can be a tedious procedure and, moreover, a significant upset has to be introduced intentionally into the process. In addition, the mathematical model obtained through process identification will be adequate at one particular operating condition, but when conditions change, the process may have to be re-identified or the performance of the control loop may become unsatisfactory.

In process control there are two major factors which contribute to unsatisfactory performance on the part of a control loop. One factor is noise in measurement, and the other factor relates to changes in parameter values resulting from changes in operating conditions.

In any control loop, it is essential to have a measuring instrument to monitor the controlled variable. Unfortunately, almost all measurements are subject to error or noise because of inherent instrument noise, limited precision of the measuring equipment, the method of obtaining the data, and/or process upsets that are too high in frequency to be corrected. If high noise levels are not accounted for in designing a controller, disturbances will be introduced into the process due to random movements of the manipulated variable caused by spurious noise.

Conventionally, there are two approaches to take in compensating for noisy signals. The first is to design the controller to be rather sluggish and the second is to use an external filter (analog or digital). However, in both of these approaches, the effects of process disturbances as well as noise are attenuated and compensation for real process upsets is delayed. For a system with a high noise-to-signal ratio and fixed sampling frequency both approaches fail to provide a satisfactory solution. Ideally, a controller should respond fast to a process upset while ignoring noise. Such a controller can be obtained when means are provided to distinguish between noise and true process upsets.

In addition to noisy measuring signals, most processes exhibit non-linear operating characteristics caused, for example, by valve backlash, long transportation delays, etc. Such factors account for the typical non-linear characteristics of most processes, and ignoring them may cause a control loop to become conditionally unstable.

One way to account for such factors is through the use of adaptive control. Several adaptive control techniques have been developed in recent years based on the use of statistical decision theory in control systems, including, for example, the parameter tracking method and the pattern recognition technique. Most of these approaches are generally unsatisfactory, however, because they are too complex mathematically or are based upon assumptions (such as no signal noise, no sloppiness in actuators) that are unrealizable in a real process.

SUMMARY OF THE INVENTION

The present invention provides a method and apparatus for an adaptive controller for use in a control process which effects ordered changes in a manipulated process variable in response to measured changes in controlled process variables.

In accordance with the adaptive feature of the controller, process identification is not necessary to permit a process model to be obtained. The design of the controller is thus simplified because a rough first estimate of a process model can be used, and through subsequent monitoring of the controller operation, the accuracy of the initial estimate can be determined and new process parameters can be established if necessary. Therefore, it is not necessary to know the physical relationships between all of the process variables.

The adaptive controller of the present invention utilizes a novel optimal filtering technique which permits discrimination between measuring noise and true process upset such that the controller will respond quickly to a process upset but will ignore measuring noise inherent in most measuring arrangements.

To this end, a predicted value for the true state of the controlled variable is obtained using the process model, and this predicted value is used together with the actual measured value of the controlled process variable to obtain an estimated value of the true state of the controlled variable.

The estimated value obtained is used as the input to the controller rather than the measured value to minimize the the effects of measurement noise. Thus, the controller is enabled to respond to changes caused by true process upsets and to be substantially insensitive to measurement noise without introducing undue delay in recognizing process upset.

The controller is adapted to compensate for changes in parameters of the process by adjusting the process model. The model is tuned slowly in increments within predetermined limits and only if there is a significant difference between the predicted value and the past best estimate of the controlled variable. Thus, it is not necessary to re-identify the process to retune the controller since controller response is based upon the process model used.

One embodiment of the invention uses a digital computer and associated control programs to implement the adaptive controller. The programs direct the digital computer to read the current value of the controlled process variable and to compute an estimated value for said controlled variable.

The estimated value thus computed is used in the computation of an adjusted value for the manipulated process variable. In addition the estimated value (of the controlled variable) and the adjusted value (of the manipulated variable) are used in making adjustments to the model when needed to provide a better predicted value for the controlled variable used in the computation of subsequent estimated values of the controlled variable.

Under program control, the computer adjusts the gain of the process model and thus the process controller through a logic routine which compares predicted and estimated values of the controlled variable and adjusts the gain within high and low limits in accordance with the value of the predicted value relative to the estimated value. The gain is increased or decreased depending on whether the estimated value is less than or greater than the value of the predicted value.

In one embodiment, the method and apparatus of the adaptive controller are described specifically with reference to an application in a paper manufacturing process to control basis weight and moisture.

BRIEF DESCRIPTION OF THE DRAWINGS

FIG. 7 is a schematic diagram of papermaking apparatus controlled by the adaptive controller provided by the present invention;

FIG. 8 is a block diagram of a feedback control loop for a basis weight controller provided by the present invention;

FIG. 10 is a block diagram of a feedback control loop for a moisture content controller provided by the present invention.

GENERAL DESCRIPTION

Introduction

Figure 1:
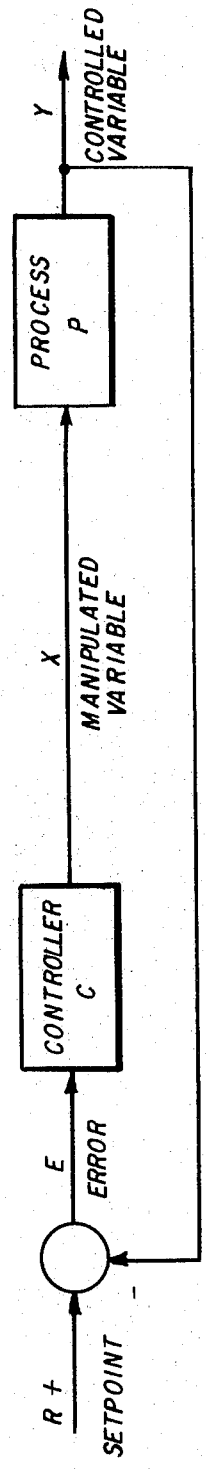
FIG. 1 is a block diagram of a feedback control loop for an ideal controlled process.

In the feedback control loop shown in FIG. 1, a controlled process variable Y of a process P varies in accordance with changes in a manipulated variable X which are introduced into the process by a process controller C. The error E is the difference between the value of a setpoint R and the true value of the controlled variable Y. The adjustment made on the manipulated variable X is related to the error E by a functional relationship specified in the controller. If the controller is properly designed, the adjustment will move the controlled variable to the setpoint, and the value of the controlled variable Y will remain equal to the value of the setpoint R.

The input E to the controller C is the difference between the value of the setpoint R and the value of the controlled variable Y. When this difference is zero, the error E is zero, and thus the input to the controller is also zero. On the other hand, any positive or negative difference between the setpoint R and the controlled variable Y will provide an input of corresponding sign to the controller, causing the controller to adjust the value of the manipulated variable X to compensate for said difference.

From the block diagram shown in FIG. 1, we can derive the overall transfer function:

(1) $Y(s)/R(s) = [P(s) C(s)/1 + C(s) P(s)]$ where $C(s)$ is the controller transfer function and $P(s)$ is the process transfer function which is obtained by identification. Therefore, if the left side of equation (1), the ratio of the controlled variable to the setpoint, is specified, the equation can be solved for $C(s)$.

The identification of the process transfer function $P(s)$ can be accomplished by making a substantial step or pulse change in the manipulated variable X, and then recording both the manipulated and the controlled variables. Next, by assuming a form for the transfer function and using linear or non-linear regression techniques, parameter values can be found which will minimize the sum of the square of the error between the experimental response and the model response.

A simple and practical form of transfer function, which is often used in the process industry, is the first order lag with dead time. The transfer function of such a model in Laplace transform notation is:

(2) $Y(s)/X(s) = P(s) = (K/\tau s + 1) e^{-sD}$ where K is the gain, and $\tau$ and D are the time constants and the dead time, respectively.

Since digital control is discrete by nature, the Z transformation with a zero order hold is used instead of the Laplace transformation. The equivalent expression in this case is:

(3) $Y(z)/X(z) = P(z) = K(1-\eta)(Z^{-\Gamma-1}/1-\eta Z^{-1})$ where $\eta = \exp(-T/\tau)$, $\Gamma = D/T$, and T is the sampling period.

An alternate form of Equation (3) is:

(4) $Y(z) - \eta Z^{-1} Y(z) = K(1 - \eta) Z^{-\Gamma-1} X(z)$ By definition, the Z operator, $Z^{-1}Y(z)$ stand for the value of Y one sampling period ago, $Z^{-2}Y(z)$ stands for the value of Y two sampling periods ago, etc. The equivalent recursion formula for equation (4) is:

(5) $Y(k) = K(1-\eta) X(k-\Gamma-1) + \eta Y(k-1)$ for $K = 1, 2, 3 \ldots$

It should be pointed out that equations (2-5) are equivalent expressions in different notation. In equations 2-5, three parameters -- namely, the time constant $\tau$, the dead time D, and the gain K define the functional relationship between the manipulated variable X and the controlled variable Y. These parameter values are obtained through identification of the process.

A simple and reliable form for the closed loop transfer function in Laplace transform notation is:

(6) $Y(s)/R(s) = (\lambda e^{-sD}/s\, s + \lambda)$ where D is the process dead time and $\lambda$ is the reciprocal of the desired closed loop time constant. In Z transform notation (with zero order hold) the above expression becomes:

(7) $Y(z)/R(z) = [(1-\theta)Z^{-\Gamma-1}/1-\theta Z^{-1}]$ where (8) $\theta = \exp(-\lambda T)$ Using the block diagram shown in FIG. 1, the overall transfer function can be related to the process $P(z)$ and controller transfer functions $C(z)$ by the following expression:

(9) $Y(z)/R(z) = [P(z)C(z)/1+P(z)C(z)]$

By combining equations 3, 7, and 9 and solving for $C(z)$, the controller transfer function, the following expression is obtained:

(10) $C(z) = [(1-\theta)/K(1-\eta)] \cdot [(1-\eta Z^{-1})/1-\theta Z^{-1}-(1-\theta)Z^{-1-1}]$ But $C(z)$ defines the transfer function between $X(z)$ and $E(z)$,

(11) $C(z) = X(z)/E(z)$

Hence by combining equations 10 and 11, it can be shown that:

(12) $X(z)/E(z) = [(1-\theta)/K(1-\eta)] \cdot [(1-\eta Z^{-1})/1-\theta Z^{-1}-(1-\theta)Z^{-\Gamma-1}]$ which in recursive form:

(13) $X(k) = [(1-\theta)/K(1-\eta)][E(k)-\eta E(k-1)] + \theta X(k-1) + (1-\theta)X(k-\Gamma-1)$ Where $X(k)$ = the manipulated variable X,
$E(k)$ = The difference between setpoint R and measured value or controlled variable Y
$X(k-1)$ = the past value of $X(k)$
$E(k-1)$ = the past value of $E(k)$
$X(k-\Gamma-1)$ = the value of $X(k)$ at $(\Gamma+1)$ sampling intervals ago
$K$ = process gain
$\Gamma$ = the equivalent number of sampling intervals for dead time
$\eta$ = exponential function of open loop time constant
$\theta$ = an exponential function of $\lambda$ as given in equation (8)

Equation (13) is the recursive formula for a digital controller $C(s)$ and defines the desired relationship between the manipulated variable X and the controlled variable Y.

The Noise Problem and the Optimal Filter

Most control applications in the process industry are characterized by two major difficulties. One difficulty is measurement noise, and the other is changes in parameter values due to changes in process operating conditions.

Figure 2:
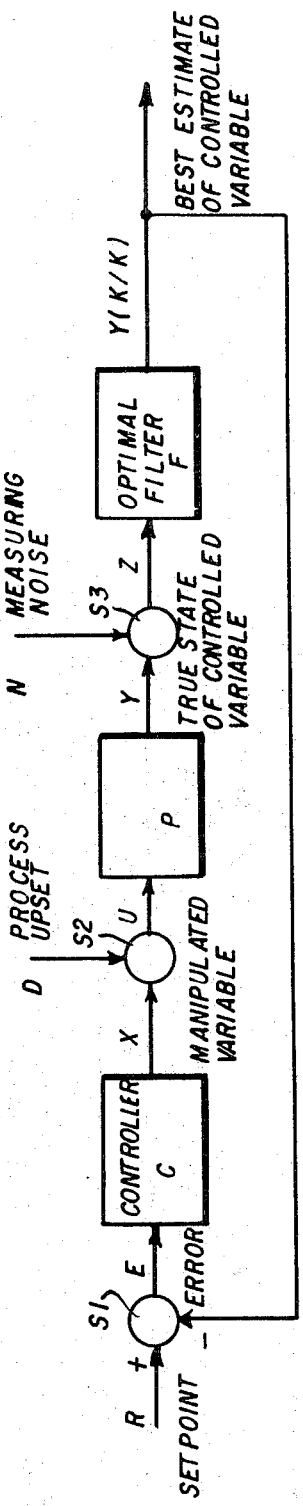
FIG. 2 is a block diagram of a feedback control loop for a physical process characterized by process upset and measuring noise.

As shown in the process control loop of FIG. 2, the input E to the controller C from summing point $S_1$ is determined by the difference between the value of the setpoint R and the value of a best estimate of the true state of the controlled variable Y. As will be shown, the best estimate of the controlled variable Y is obtained through the use of an optimal filter F which supresses the level of noise without losing signal fidelity. That is, the best estimate of the controlled variable Y reflects true process upsets D while minimizing the effects of measuring noise N.

As can be seen in the block diagram of FIG. 2, the process upset D is introduced at the summing point $S_2$ and for purposes of analysis is added to the value of the manipulated variable X to form a total change U.

The measuring noise N is indicated as being introduced at summing point $S_3$ at the output of the process P and at the point at which measurement of the controlled variable Y is made, providing measured value Z for the process variable Y.

Without the use of the optimal filter F which has been provided by the present invention, the measured variable Z which is used to determine the input to the process controller C would reflect not only true process upsets D but also measuring noise N which is introduced into the system due to the inefficiencies of the measuring instruments, etc.

In any control loop, it is essential to have a measuring instrument to monitor the controlled variable Y. Unfortunately, most measurements are subject to error or noise caused, for example, by inherent instrument noise, limited precision and reproducibility, the method of obtaining the data, and signal fluctuations which are at too high a frequency to be corrected.

It is desired that the controller C respond quickly to a setpoint range, and reasonably fast to a process upset, while ignoring high frequency noise. Accordingly, the optimal filter F is introduced into the control loop between the process output and the input to the process controller C to provide a signal input to the control which reflects true process upsets D while minimizing measuring noise N.

In the system represented by the block diagram of FIG. 2, the process upset D is a random walk type of disturbance (i.e., the integration of a white noise), and the measuring noise N is white noise. The transfer function of the process P is given by equations (2) and (3) and the equation for the controller is (13).

The following relationship can be derived from the block diagram of FIG. 2 and equation (3):

(14) $Y(z)/U(z) = P(z) = K(1-\eta)(Z^{-\Gamma-1}/1-\eta^{-1})$ which can be rewritten in the recursive form as:

(15) $Y(k) = K(1-\eta)U(k-\Gamma-1) + \eta y(k-1)$

Substituting the index $K-1$ for the index $K$ in equation (15) gives:

(16) $Y(k-1) = K(1-\eta)U(k-\Gamma-2) + \eta Y(k-2)$ which if subtracted from (15) gives:

(17) $\Delta Y(k) = K(1-\eta)\Delta U(k-\Gamma-1) + \eta \Delta Y(k-1)$ where the notation $\Delta$ stands for the difference between two consecutive values. Hence, if we know $\Delta U(k-\Gamma-1)$ and $\Delta Y(k-1)$, then from equation (17) we can predict $\Delta Y(k)$.

From FIG. 2 it is apparent that the value for the process control variable U is the sum of the manipulated variable X and the process upset D or;

(18) $\Delta U(k-\Gamma-1) = U(k-\Gamma-1) - U(k-\Gamma-2) = X(k-\Gamma-1) + D(k-\Gamma-1) - X(k-\Gamma-2) - D(k-\Gamma-2)$ Since the process upset D is a random walk type of disturbance, $\Delta D$ is white noise and the best estimates of the difference between successive measurements is zero. Therefore,

(19) $\Delta U(k-\Gamma-1/k-\Gamma-1) = \Delta X(k-\Gamma-1)$ where the notation at the left means the estimate of $\Delta U$ at $(k-\Gamma-1)$th period, with all information available up to $(k-\Gamma-1)$th period. In general, $Y(i/i-j)$ means the estimate of the variable Y at $i$, with information available up to $i-j$ period, e.g., $Y(i/i-1)$ indicates the predicted value of $Y(i)$ without the present measurement, and $Y(i/i)$ is the best estimate of $Y(i)$ with the present measurement along with all the previous information.

Using the estimate for the true state of the controlled variable Y, and taking advantage of the relationship expressed in equation (19), it can be shown that equation (17) becomes:

(20) $\Delta Y(k/k-1) = K(1-\eta)\Delta X(k-\Gamma-1) + \eta\Delta Y(k-1/k-1)$ where $Y(k/k-1)$ is a predicted value for $Y(k)$, and $\Delta Y(k-1/k-1)$ is the difference between successive best estimates of the true state $Y(k)$. By definition:

(21) $\Delta Y(k/k-1) = Y(k/k-1) - Y(k-1/k-1)$
$\Delta Y(k-1/k-1) = Y(k-1/k-1) - Y(k-2/k-2)$ from equations (20) and (21) the following is obtained:

(22) $Y(k/k-1) - Y(k-1/k-1) + K(1-\eta)\Delta X(k-\Gamma-1) + \eta\Delta Y(k-1/k-1)$ There are two values with which to work in getting a best estimate of $Y(k/k)$; one is the predicted value $Y(k/k-1)$ and the other is the measurement $Z(k)$. The predicted value $Y(k/k-1)$ does not reflect the current process disturbance D (FIG. 2) or the measurement noise N. On the other hand, the measured value $Z(k)$ is affected by both parameters.

A way to infer the best estimate $Y(k/k)$ from the predicted value $Y(k/k-1)$ and the measured value $Z(k)$ is theorized as follows: If there is no disturbance and no measurement noise, then the predicted value $Y(k/k-1)$ should agree with the measurement $Z(k)$. Because of process upset D and measurement noise N, however, the measurement $Z(k)$ deviates from the predicted value $Y(k/k-1)$. This variance $\sigma^2$ may be broken into two parts representing a process upset factor $\sigma_D^2$ which results from the disturbance and the measurement noise factor $\sigma_D^2$ which results from measurement noise, i.e.,

(23) $\sigma^2 = \sigma_N^2 + \sigma_D^2 = [Y(k/k-1) - Z(k)]^2$

The measurement noise factor $\sigma_N^2$ is the variance evaluated from a sequence of measurements while the process is running its steady state condition. The process upset factor $\sigma_D^2$ is the squared deviation of the measurement from the setpoint minus the measurement noise factor $\sigma_N^2$.

By definition the variance of the difference between the true state $Y(k)$ and the prediction $Y(k/k-1)$ is:

(24) $\sigma_D^2 = e[Y(k)-Y(k/k-1)]^2$ where $e$ is a statistical expression for the expected value.

Also by definition, the difference between the true state $Y(k)$ and the measurement $Z(k)$ is:

(25) $\sigma_N^2 = e[Y(k) - Z(k)]^2$

Since the value of $Y(k)$ is not known accurately, there is no way to evaluate either the process upset factor $\sigma_D^2$ or the measurement noise factor $\sigma_N^2$ directly. If the measurement noise factor $\sigma_N^2$ is much larger than the process upset factor $\sigma_D^2$ however, the best estimate $Y(k/k)$ should be very close to the prediction $Y(k/k-1)$. On the other hand, if the measurement noise factor $\sigma_N^2$ is much smaller than the process upset factor $\sigma_D^2$, then the best estimate $Y(k/k)$ should be very close to the measurement $Z(k)$. In general, the best estimate $Y(k/k)$ should lie between the measurement $Z(k)$ and the prediction $Y(k/k-1)$. A precise formula which satisfies the above description is as follows:

(26) $Y(k/k) = Y(k/k-1) + W[Z(k) - Y(k/k-)]$ where W is a noise weighting factor defined as:

(27) $W = \sigma_D^2 / (\sigma_D^2 + \sigma_N^2)$ and where the value $Y(k/k)$ represents the best estimate of the true state $Y(k)$ with all the information available up to the $k$th sample.

The value of the noise weighting factor W can be obtained by collecting a sequence of measured values and using equations (22) and (26) to obtain an average value for the noise weighting factor W. A typical value for the noise weighting factor W is 0.3.

Adaptive Controller

The process controller C (FIG. 2) is designed to give a desirable overall response based upon a given process model. If, however, the process behavior changes, the actual overall response will deviate somewhat from the expected response. When the difference between true process behavior and the process behavior predicted by the model becomes great enough, the control loop may become unstable. Accordingly, it is desirable that the controller C be adaptive to changes in the process. One way to retune the process controller is to reidentify the process. However, the identification procedure is quite time-consuming and a substantial process upset has to be intentionally introduced into the system. An ideal way is to identify the process while the process is under closed loop control.

This approach is obtained in accordance with the adaptive controller of the present invention in which a technique is proved for adapting the process model to changes in the process behavior.

The equation for the digital controller C was given by equation (13) which is repeated below:

(28) $X(k) = [(1-\theta)/K(1-\eta)][E(k) - \eta E(k-1)] + \theta X(k-1) + (1-\theta)X(k-\Gamma-1)$ Equation (13) relates the values for the present error $E(k)$, previous error $E(k-1)$ and previous manipulated variable settings $X(k-1)$ and $X(k-\Gamma-1)$ to the present value required of the manipulated variable X.

Since previous values of the manipulated variable X and the controlled variable Y are known, a predicted value $Y(k/k-1)$ can be obtained from equations (22) and (5) and is given by the following equation:

(29) $Y(k/k-1) - K(k-1)(1-\eta)X(k-\Gamma-1) + \eta Y(k-1)$ where $K(k-1)$ is the gain estimated at the previous time. When there is no disturbance or measuring noise, the measurement will be the true state $Y(k)$ which can be evaluated by the following equation:

(30) $Y(k) = K(k)(1-\eta) \cdot X(k-\Gamma-1) + \eta Y(k-1)$

The value of the true state $Y(k)$ should agree with the value for the predicted value of the true state $Y(k/k-1)$ provided that the process gain K does not change. If the value of the true state does not agree with the predicted value for the true state $Y(k/k-1)$, then the gain of the system can be adjusted accordingly using the following relationship:

(31) $K(k) = K(k-1) + [Y(k) - Y(k/k-1)/(1-\eta)X(k-\Gamma-1)]$

A real process is different from an idealized system in that in a real process there are always disturbances and measuring noise which will cause the measurement to deviate from the predicted value $Y(k/k-1)$. In addition, not only the gain but also the time constant of the control loop will vary. Furthermore, the process dynamics may not exactly fit the model which has been assumed for the process.

To compensate somewhat for these limitations introduced by disturbance and noise, the value for the best estimate $Y(k/k)$ is used rather than the value of the direct measurement $Z(k)$. In addition, the model is retuned only if there is a significant difference between the predicted value Y(k/k−1) and the past best estimate Y(k−1/k−1). Furthermore, the gain of the model is adjusted slowly and gradually using incremental changes until the desired gain is obtained, and an upper and lower limit is set for the gain adjustment.

Digressing for a moment, consider the variation in the time constant of the process model. It is not necessary that the model describe the desired process exactly due to the adaptive feature of the controller which is afforded by making the model tunable. If the gain is overestimated, the response will be more sluggish than expected, and if the gain is underestimated, the response will be overactive. Simulation studies show that for controller design purposes, a change in time constant may be approximated by a change in gain. Accordingly, compensation for gain changes will automatically compensate for deviations in time constant.

Consequently, it is only necessary to tune the gain to make the controller adaptive. The logic for adaptive tuning is shown in FIG. 3.

Figure 3:
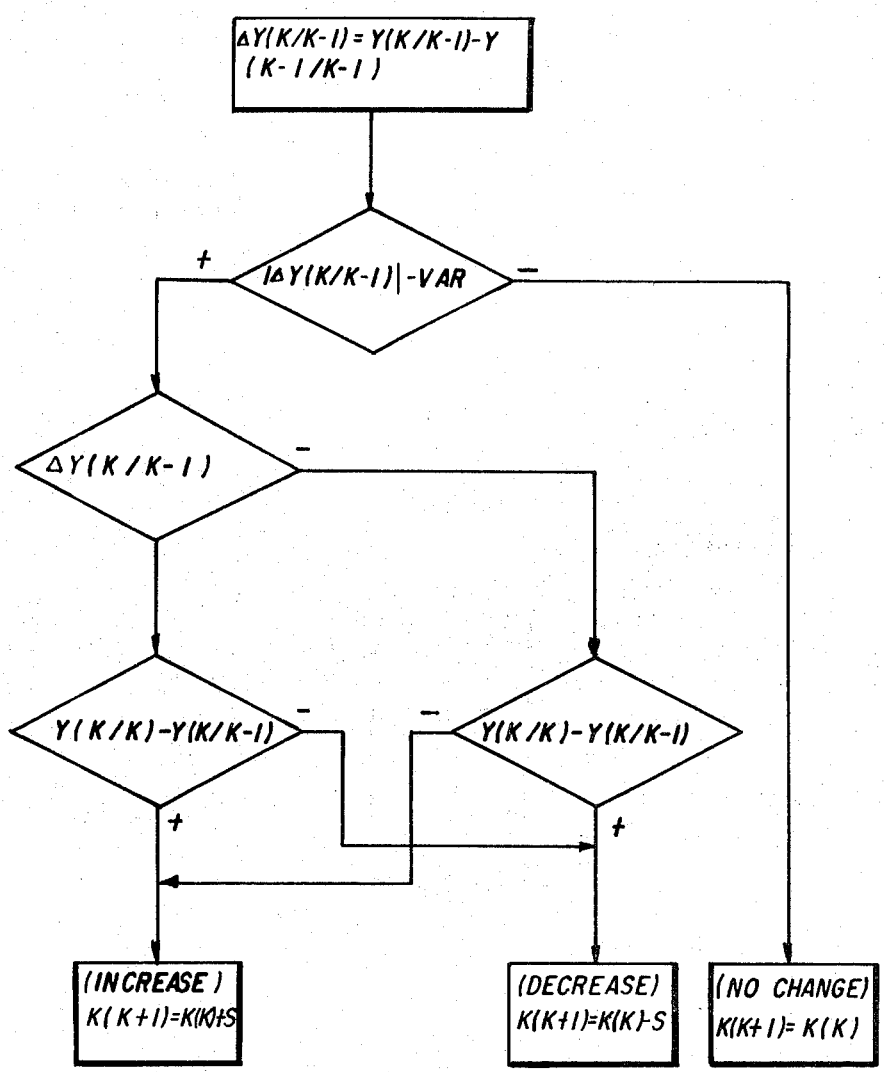
FIG. 3 is a flow chart for the logic of gain adaption for an adaptive process controller provided by the present invention.

Referring to the flow chart of logic gain adaptation given in FIG. 3, first the difference between the predicted value Y(k/k−1) and the past best estimate of Y(k−1/k−1) of the true state Y(k) is compared to a variation standard VAR. If the difference between the predicted value and the past best estimate is less than VAR, no change will be made in the gain. The variation standard VAR should be approximately two standard deviations of the measuring noise.

If, on the other hand, the difference between the predicted value Y(k/k−1) and the past best estimate is greater than VAR, the predicted value will be compared to the best estimate to determine if the gain should be increased or decreased.

To avoid introducing a sudden substantial change in the loop gain, the gain is increased in 2 percent increments of the gain factor (G). In addition, limits ranging from 20 to 50 per cent are set on the amount of change allowed to the gain.

Our digital controller is defined by equation (13) from which it can be seen that the manipulated variable X is related to the error E by the reciprocal of the process gain K. Therefore, the controller is adapted to an operating condition change, when the process model is adjusted via its gain to reflect said change.

Figure 4:
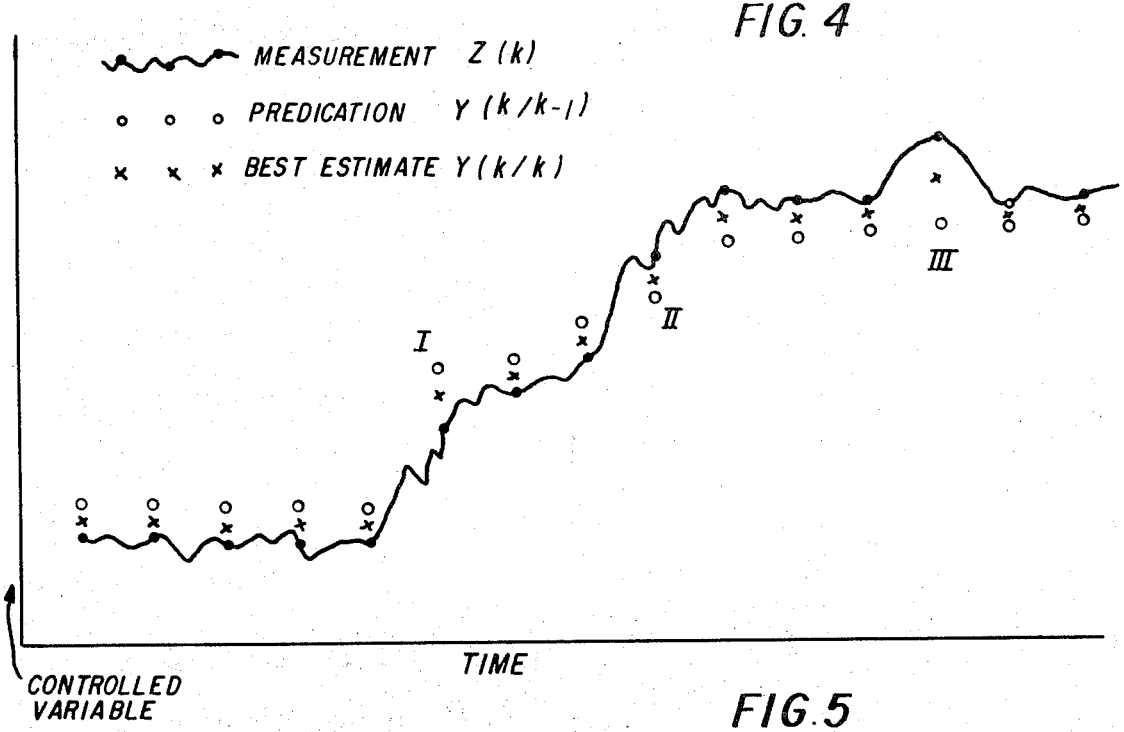
FIG. 4 is a graph showing the relationship between measured values of a controlled process variable and predicted and estimated values of the controlled variable.

In FIG. 4, there are shown three sets of points representing measured values Z(k), predicted values Y(k/k−1), and best estimates Y(k/k), the weighted average of the measured value and the predicted value.

Whenever the predicted value is greater than the best estimate and there is a significant difference between the latest prediction and the last best estimate, such as at point I, the gain will be decreased such that the predicted value will approach the estimated value.

At point II, where the predicted value is less than the best estimate and there is a significant difference between Y(k/k−1) and Y(k−1/k−1) the gain will be increased. At point III, where the predicted value is less than the best estimate, but there is not a significant difference between the prediction, Y(k/k−1), and the past best estimate Y(k−1/k−1), the gain will not be changed, because said difference is not due to model error but caused by a process upset or measurement noise.

In summary, the logic of gain adaptation operates as follows: First, the predicted value is compared to the past best estimate, to see if a significant difference exists between them. If there is, the predicted value is then compared to the best estimate to determine whether the estimate lies above or below the predicted (model) response. The model gain is then incremented accordingly.

In the illustrated embodiment, the gain is increased or decreased in increments of 2 percent within specified limits. Thus, the difference between the prediction and the best estimate determines the direction of the 2 percent gain change provided that the predicted value Y(k/k−1) differs sufficiently from the past best estimate Y(k−1/k−1).

Whenever the predicted value Y(k/k−1) shows less change than the best estimate the process gain is increased and if the best estimate shows less change than the predicted value the process gain will be decreased.

DESCRIPTION OF A CONTROL PROCESS USING THE ADAPTIVE CONTROLLER AND OPTIMAL FILTER

Figure 5:
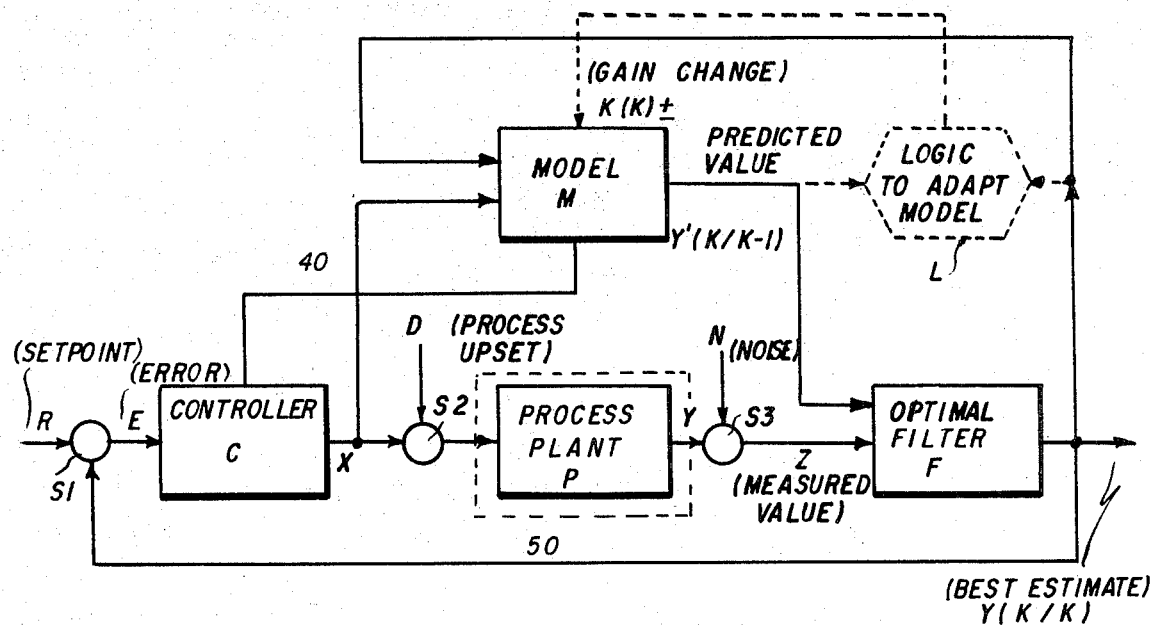
FIG. 5 is a block diagram of a process control system including an adaptive controller and optimal filtering provided by the present invention.

Referring to FIG. 5, there is shown a block diagram of a system control loop including adaptive tuning of the model and optimal filtering. In the block diagram of FIG. 5, the bold line indicates the basic feedback loop including the controller C and the physical process P or plant which is controlled by the process controller. The controller is defined by equation (13) which is repeated here:

(13)  $X(k) = [1 - \theta/K(1-\eta)][E(k) - \eta E(k-1)] + \theta X(k-1) + (1-\theta)X(k-\Gamma-1)$ where K, $\eta$, and $\Gamma$ are parameters developed from the model and $\theta$ is an exponential function of the desired closed loop time constant.

As is the case in the block diagram of FIG. 2, the error input E to the controller is the difference between the setpoint R and the best estimate of the controlled variable Y(k/k) which is obtained through the use of the optimal filter F which operates to distinguish between true process upsets D and process measuring noise N.

The light lines implement the optimal filter F wherein the predicted value Y(k/k−1) depends upon the previous best estimate Y(k−1/k−1) and the output X(k) from the control algorithm in accordance with the relationship given by equation (22), which comprises the process model M.

(22)  $Y(k/k-1) = Y(k-1) + K(1-\eta)\Delta X(k-\Gamma-1) + \eta \Delta Y(k-1)$

The inputs to the optimal filter F are the measured value Z(k) and the predicted value Y(k/k−1) which is determined from the model.

The best estimate is the weighted average of the predicted value Y(k/k−1) and the measurement Z(k) as given in equation (26):

(26)  $Y(k/k) = Y(k/k-1) + W[Z(k) - Y(k/k-1)]$ where W is a weighting factor.

The dashed lines in the block diagram of FIG. 5 show the adaptive tuning feature implemented by the adaptive gain control logic (FIG. 3) which tunes the model M.

Since our controller (see equation (13)) contains the model gain K as an integral part of its structure, controller tuning is automatic when model gain is adjusted adaptively.

The adaptive controller comprising the controller C, the optimal filter F, the mathematical model M and the model gain adaption logic L provided by the present invention can be implemented either by a digital computer and associated software (represented by the block 40 in FIG. 7) or by hard wired logic employing appropriate logic circuitry. In the preferred embodiment using a control sub-routine known as the OPCON digital controller. The program is written in Fortran language and is a sub-routine for a mainline process control program. The OPCON program can be stored as part of a general purpose control library and can be used in various controlled processes via changes in the arguments of the Fortran call from the mainline program. That is, the arguments of the Fortran sub-routine contain all the information needed to define the process to be controlled, therefore, this sub-routine is completely generalized and can be used by any number of mainline control programs just be redefining the arguments of the CALL. A program flow chart for the OPCON control sub-routine is given in FIG. 6 which flow chart contains all the essential equations and logic of the optimal filter, the adaptive tuning and the controller.

BRIEF DESCRIPTION OF THE CONTROL SUB-ROUTINE

The statements which comprise the OPCON control subroutine are given in Table I. It is seen that the program proceeds with comment statements each led by the letter C, which gives the purpose, usage, and description of the parameters of the program, followed by functional statements which indicate the operations to be performed.

Figure 6:
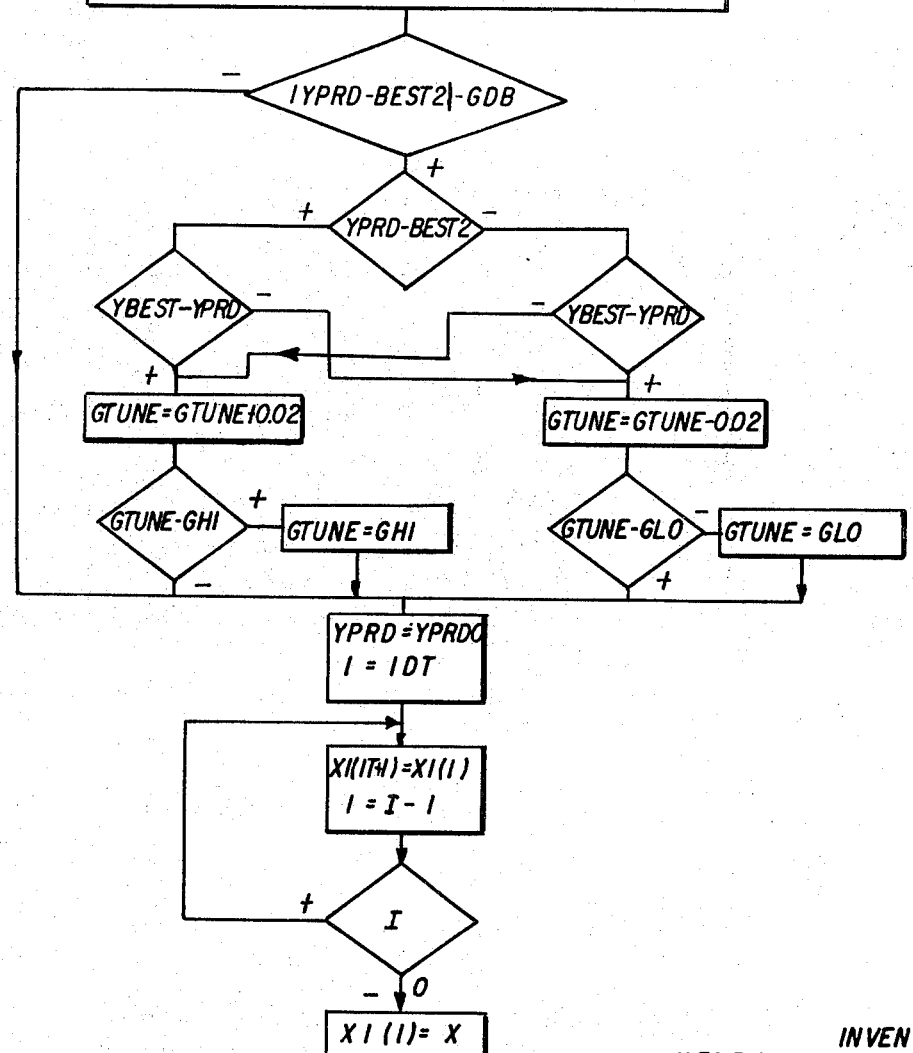
FIG. 6 is a flow chart for a computer program embodying the adaptive controller of the present invention.

Briefly, referring to the program flow chart given in FIG. 6, the sub-routine uses equation (26) to compute a value for the best estimate Y(k/k) of the true state of the controlled variable Y from a weighted average of the predicted value Y(k/k−1) and the measured value Z(k) using the following relationship:

(26)  YBEST = YPRD + W(YMESU − YPRD)

As has been mentioned above, the best estimate YBEST is used to represent the controlled variable rather than the actual measured value YMESU in order to minimize the effects of measurement noise.

TABLE I
OPCON SUB-ROUTINE

```
C
C      ..................................................
C           SUBROUTINE  OPCON
C
C      PURPOSE
C           AN SELF ADAPTIVE CONTROLLER FOR USE IN A CONTROL PROCESS FOR
C           PROVIDING CHANGES IN A MANIPULATED VARIABLE,X, IN RESPONSE
C           TO MEASURED CHANGES IN A CONTROLLED VARIABLE,Y,HAVING MEANS
C           FOR USING MEASUREMENTS AND PREDICTIONS OF THE CONTROLLED
C           VARIABLE TO OBTAIN THE BEST ESTIMATE OF THE CONTROLLED VARI-
C           ABLE,WHICH IS USED TO DETERMINE THE CHANGE IN MANIPULATED
C           VARIABLE.
C
C      USAGE
C           CALL OPCON(YMESU,YSP,YPRD,YBEST,ERR,X,XI,IDT,TAUO,TAUC,GEST,
C           GTUNE,GHI,GLO,GDB,W)
C
C      DESCRIPTION OF PARAMETERS
C           YMESU  - MEASURED VALUE OF THE CONTROLLED VARIABLE
C           YSP    - SET POINT OF THE CONTROLLED VARIABLE
C           YPRD   - PREDICTED VALUE OF THE CONTROLLED VARIABLE
C           ERR    - ERROR BETWEEN THE SET POINT AND THE BEST ESTIMATE OF
C                    THE CONTROLLED VARIABLE
C           X      - THE DESIRABLE SETTING OF MANIPULATED VARIABLE
C           XI     - AN ARRAY OF PREVIOUS SETTINGS OF MANIPULATED VARI-
C                    ABLE WITH A DIMENSION OF (IDT+1)
C           IDT    - DEAD TIME FACTOR, = DEAD TIME / SAMPLING PERIOD
C           TAUO   - FUNCTION OF OPEN LOOP TIME CONSTANT
C                    = EXP(-SAMPLING PERIOD / OPEN LOOP TIME CONSTANT)
C           TAUC   - FUNCTION OF CLOSED LOOP TIME CONSTANT,
C                    = EXP(-SAMPLING PERIOD / CLOSED LOOP TIME CONSTANT)
C           GEST   - INITIAL ESTIMATE OF STEADY STATE GAIN BETWEEN THE
C                    MANIPULATED VARIABLE AND THE CONTROLLED VARIABLE
C           GTUNE  - TUNING PARAMETER
C           GHI    - UPPER LIMIT OF GTUNE
C           GLO    - LOWER LIMIT OF GTUNE
C           GDB    - DEAD BAND FOR TUNING
C           W      - WEIGHING FACTOR
C
C      REMARK
C           WHEN ON MANUAL SET
C           YPRD  = YSP
C           YBEST = YSP
C           ERR   = 0
C           GTUNE = 1.0
C           XI    = PRESENT SETTING OF THE MANIPULATED VARIABLE
```

Table I—Continued

```
                C
                C           THE FOLLOWING PARAMETERS SHOULD BE SAVED IN MEMORY
                C           YPRD,YBEST,ERR,XI,GTUNE
                C
                C           SUBROUTINES AND FUNCTION SUBROUTINES REQUIRED
                C              ABS
                C
                C      ..........................................................
                C
0001                 SUBROUTINE OPCON(YMESU,YSP,YPRD,YBEST,ERR,X,XI,IDT,TAUO,TAUC,GEST,
                    1 GTUNE,GHI,GLO,GDB,W)
0002                 DIMENSION XI(1)
                C
                C          HISTORICAL SHIFT
                C
0003                 BEST2=YBEST
0004                 ERR2 =ERR
                C
                C          THE BEST ESTIMATE IS A WEIGHTING AVERAGE OF MEASUREMENT
                C          AND PREDICTION
                C
0005                 YBEST=YPRD +W*(YMESU- YPRD)
                C
0006                 ERR=YSP- YBEST
0007                 GAIN=GEST*GTUNE
0008                 X=(1.-TAUC)/(1.-TAUO)/GAIN*(ERR-TAUO*ERR2)+TAUC*XI(1)
                    1 +(1.-TAUC)*XI(IDT+1)
0009                 YPRDO=GAIN*(1.-TAUO)*(XI(IDT)-XI(IDT+1))+TAUO*(YBEST-BEST2)+YBEST
                C
                C          THE CONTROLLER WILL BE ADAPTED IF A SIGNIFICANT CHANGE HAS
                C          OCCURED
                C
0010                 IF(ABS(YPRD -BEST2)- GDB) 100, 10,10
0011              10 IF(YPRD-BEST2)15,100,20
0012              15 IF(YBEST-YPRD) 22,17,17
0013              17 GTUNE = GTUNE-0.02
0014                 IF(GTUNE-GLO) 18,100,100
0015              18 GTUNE = GLO
0016                 GO TO 100
0017              20 IF(YBEST - YPRD) 17,22,22
0018              22 GTUNE = GTUNE +0.02
0019                 IF (GTUNE - GHI) 100,100,23
0020              23 GTUNE = GHI
                C
                C          HISTORICAL SHIFT
                C
0021             100 YPRD = YPRDO
0022                 I=IDT
0023             101 XI(I+1)=XI(I)
0024                 I=I-1
0025                 IF(I) 102,102,101
0026             102 XI(1)=X
0027                 RETURN
0028                 END
```

The value of the error ERR between the setpoint R and the best estimate $Y(k/k)$ is determined using the following relationship:

ERR = YSP − YBEST

The error which is the difference between the setpoint and the best estimate is the input to the controller C and is one of the variables of equation (13) which defines the controller. For an initial value, the error is set equal to zero.

Process gain GAIN is obtained by multiplying the initial gain estimate GEST by a gain tuning parameter GTUNE which is obtained through the logic of gain adaptation. The initial value for the gain tuning factor GTUNE is one.

Then the error and gain obtained are used to compute the value of the manipulated variable X using equation (13):

(13)  X = (1−TAUC)/(1−TAUO)/GAIN*(ERR−TAUO*ERR2) + TAUC *XI(1) + (1−TAUC)*XI(IDT + 1)

The predicted value for th next cycle is obtained from equation (22):

(22)  YPRDO = GAIN * (1−TAUO) * (XI(IDT) − XI(IDT+1)+TAUO*(YBEST−BEST2)+YBEST

The balance of the program is comprised mainly of the logic of gain adaptation by which the predicted value YPRD is compared with the past best estimate BEST2 and the best estimate YBEST to determine if the gain should be adjusted and whether the gain should be increased or decreased. The gain adaptation portion of the program computes a value for the gain tuning factor GTUNE.

The statements which comprise the Fortran language sub-routine are listed in Table I. The Fortran program is made up of a series of statements, each of which is either in order to carry out some operation or a source of information regarding the program. The statements provide information about the program, particularly definition of variables and its usage. The instructions which relate to a specific application of the adaptive control sub-routine to the paper manufacturing process will be described hereinafter.

APPLICATION OF THE CONTROLLER PROGRAM TO A PHYSICAL PROCESS

The OPCON adaptive controller sub-routine is part of a main control program used for control by a digital computer such as an IBM Model 1800 process control computer. Through its use a system of control algorithm in the computer is adapted in such a way that it is responsive to changes in the parameters characteristic of the controlled process variables which are measured by appropriate measuring apparatus, and the system of algorithms provide corresponding changes in the value of a manipulated process variable X to compensate for deviations from a desired operating condition.

The constants and initial conditions required for the sub-routine OPCON are given in the mainline program via the arguments; the variable input data required to implement the scheme include the measured value YMESU and the setpoint YSP, both of which are obtained from outside sources such as analog inputs and manual entry stations.

It is pointed out that the OPCON control sub-routine utilizes measured values to compute desired changes in process variables. In addition, other sub-routines, which will be described hereinafter, are also used with the OPCON control program to affect adjustments of variables in the physical process.

Specific Application of the Adaptive Controller to the Control of Basis Weight Equation (2), which defines the control system transfer functions, and equation (13), which defines the controller for the system, are applicable to any system in which the process dynamics are characterized by a first order lag with dead time, and thus the OPCON control program is preferably used in systems so characterized. However, it is pointed out that other higher order processes can be approximated by a first order lag, and the adaptive feature of the control system provided by the present invention will permit desirable closed loop performance to be obtained in such system. By way of illustration, the adaptive controller will be described in an application in a paper manufacturing operation to control the basis weight and moisture content of paper during the manufacturing process.

The schematic diagram given in FIG. 7 shows paper manufacturing apparatus 50 that is controlled by a digital controller using the OPCON control sub-routine provided by the present invention. Briefly, in the paper manufacturing process shown, the apparatus 50 forms a continuous web or sheet of paper 20 from a mixture of fibrous stock contained in a headbox 21. The mixture is deposited in a continuous web onto a Fourdrinier wire 22 as the wire passes about a breast roll 23. Most of the water is drained through the wire into a white water silo 25 as the paper web is conveyed on the wire 22 until the wire passes the couch roll 26 at which point the paper leaves the wire and is fed between press rolls 27 and over dryers 28 for the removal of additional moisture. The finished paper web or sheet then passes onto the windup reel 29.

For purposes of control, this basis weight and moisture content of the paper web are measured at a point between the dryers 28 and the takeup reel 29 through the use of a measuring apparatus including a beta gauge 30 and an infrared sensor 31, to measure basis weight BW and moisture content MOI, respectively.

Basis weight is controlled by adjusting the consistency of the stock suspension in the headbox 21. This suspension consists of a continuously flowing mixture of roughly 5,000 gallons per minute of white water having a consistency of approximately 0.2 percent recycled via a fan pump 32 from the white water silo 25, and roughly 500 gallons per minute of a "thick" stock having a consistency of approximately 3 percent flowing through a stock flow valve 34 and into said fan pump 32. When the setting $X(k)$ of the stock flow valve (and thus the rate of flow of the thick stock into the headbox) is changed, a corresponding change occurs in the total solids content of the mixture in the headbox. Such a change can be obtained with relatively minute adjustments in the volume per minute flow of the thick stock. The setting $X(k)$ of the stock flow valve 34 is the manipulated variable of the process control loop. Thus, the basis weight of the paper being produced is controlled by adjusting the stock flow valve 34 to allow less or more thick stock into the total flow line, thereby to adjust the consistency of the stock suspension in the headbox 21.

The basis weight is measured by a beta gauge 30 mounted on a scanning frame (not shown) located at the end of the dryer section 28 of the apparatus. A scanning frame and beta gauge for this purpose are well known in the paper manufacturing industry and such monitoring apparatus are shown, for example, in U.S. Pat. Nos. 2,750,986; 2,790,945; and 2,829,268.

The beta gauge 30 carried on the scanning frame, is moved across the width of the paper web once every 60 seconds and provides an output signal, ranging from 0–5 mv, which is proportional to the amount of beta particles present in a beam after said beam has passed through the moving paper web 20 at the point of measurement and thus gives a good approximation of the mass of the paper web. The output signal provided by the beta gauge 30 is sampled every 2 seconds by a digital computer 40, and the outputs provided by each 60 second scan are averaged providing an average basis weight BW for each scan. The average basis weight is the controlled variable Y in the basis weight control loop, but its control is not achieved via the direct manipulation of the stock valve. Instead, control is achieved via a cascaded control system with a dry basis weight controller adjusting a dry stock flow (mass rate of flow of pulp to the machine 50) set point in the outside loop and a dry stock controller adjusting the stock flow valve in the inner loop is shown in FIG. 8. In this particular instance, both controllers are implemented by digital algorithms in a process control computer with dry basis weight being defined as the basis weight BW measured minus the per cent moisture content MOI measured and is given by the expression:

(32)  $DBW = BW (100 - MOI) 0.01$

The process dynamics between the DSF controller and the basis weight and moisture content measuring apparatus 30, 31 shown in the block diagram of FIG. 8, can be approximated by a first order lag plus dead time, and accordingly, the setpoint $X(k)$ of the DSF controller is given by equation (13):

(13)  $X(k) = [(1-\theta)/K(1-\eta)] [E(k) - \eta E(k-1)] + \theta X(k-1) + (1-\theta)X(k-\Gamma-1)$ where $X(k-1)$, $X(k-2)$ are the two previous settings of the DSF setpoint, $E(k)$, $E(k-1)$ are the present and previous dry basis weight errors, that is, the difference between the dry basis weight setpoint DBWSP and the dry basis weight measured DBW, and K is the process gain. Typical values for the process constants $\theta$, $\eta$ and K obtained for one papermaking machine are as follows:

$\theta = \exp(-\Gamma T) = \exp(-60/100)$
$\eta = \exp(-T/\tau) = \exp(-60/80)$
$K = 2.0$ Basis Weight Controller In the basis weight controller shown schematically in FIG. 8, the primary manipulated variable is the thick stock flow 49 supplied to the apparatus 50 controlled by the basis weight controller 52 and dry stock flow controller 51 which together comprise the digital controller 40. Every four seconds, the consistency and flow rate of the thick stock are monitored. The stock valve 34 is operated under computer control by an output of the dry stock flow controller 51 to give the desired dry stock flow (the product of consistency and flow rate). The target value or setpoint R for dry stock is set by the basis weight controller 52 which is comprised of the OPCON control program.

Thus, referring to FIG. 8, it is seen that a cascade control scheme is used in the control of basis weight, the basis weight being controlled by a first outer loop, and the dry stock flow being controlled by a second inner loop.

Responsive to each dry stock flow measurement obtained the digital computer 40 provides a control pulse the width of which is proportional to the desired change in valve position with direction being controlled by the address of the ECO used. Changes in valve position are calculated via the dry stock flow controller 51 using the dry stock flow setpoint DSFSP as provided by the basis weight controller (OPCON program) and the dry stock flow DSF which is obtained by multiplying the stock volumetric flow rate by stock consistency.

The dry stock flow setpoint is provided by the basis weight controller 52. The input to the basis weight controller 52 is the difference between the basis weight setpoint BWSP and the basis weight measurement BW obtained through the use of the beta gauge 30 and infrared moisture sensor 31.

Summarily, the basis weight controller effectively comprises a cascade control scheme. The first control loop (dry stock controller 51) controls actual valve movement as a function of dry stock flow change, and the second control loop, (the basis weight controller 52) controls the dry stock flow setpoint DSFSP as a function of dry basis weight change.

The basis weight is proportional to the dry stock flow and inversely proportional to the speed of the machine. Thus, the steady state gain K of the basis weight and dry stock flow controller given in equation (13) can be expressed by the relationship:

(33)  $K = [(\text{constant})(\text{stock consistency})(\text{slope of valve curve})/(\text{machine speed})(\text{machine width})]$ where the constant (a function of the paper processing machine) serves to convert fiber flow to basis weight so that the gain K can be expressed in units of pounds of basis weight per gallon per minute of thick stock flow change.

In the basis weight controller (FIG. 8), the basis weight and moisture measurements provided by the beta gauge 30 and moisture gauge 31 (FIG. 7) are used in equation (32) to obtain values of dry basis weight DBW, and the values obtained along with other required data, serve as inputs to the computer for the control sub-routine which will output the current setting for RATIO defined by equation (37) to provide the dry stock flow setpoint DSFSP for the dry stock flow controller 51 (FIG. 8). The dry stock flow setpoint DSFSP serves as an input to the dry stock flow controller 51 which together with the value of the dry stock flow will affect the determination of a setting for the stock flow valve 34 under the control of the dry stock flow controller 51.

The following description of a mainline computer program which is used with the OPCON control subroutine relates only to the basis weight controller 52 which outputs the dry stock flow setpoint DSFSP. A further program would be used to implement the dry stock flow controller 51 which provides the output for effecting actual manipulation of the stock flow valve.

Equation (33) can be factored as follows:

(34)  $K = K1 \cdot K2$
(35)  $K1 = \text{dry stock flow/valve movement} = (\text{consistency})(\text{slope of valve curve})$ where K1 is related to the process dynamics between the valve controller 51 (FIG. 8) and the stock flow 49 (the operating characteristic of the valve), and where

(36)  $K2 = \text{dry basis weight change/dry stock flow change} = (\text{constant})/(\text{machine speed})(\text{machine width})$ is related to the process dynamics between stock flow 49 and basis weight (the dynamics of the papermaking machine). It is apparent that the product $K1 \times K2$ represents the gain of the total process from the stock valve controller (51) to the basis weight. Furthermore, denoting the ratio

(37)  RATIO change = dry stock flow change/machine speed then from equations (36) and (37):

(38)  Dry basis weight change/RATIO change = (constant)/machine width

The right hand side of equation (38) is constant for a given paper manufacturing machine with a typical value being 2,200.

Mainline Program for Basis Weight Controller

Figure 9:
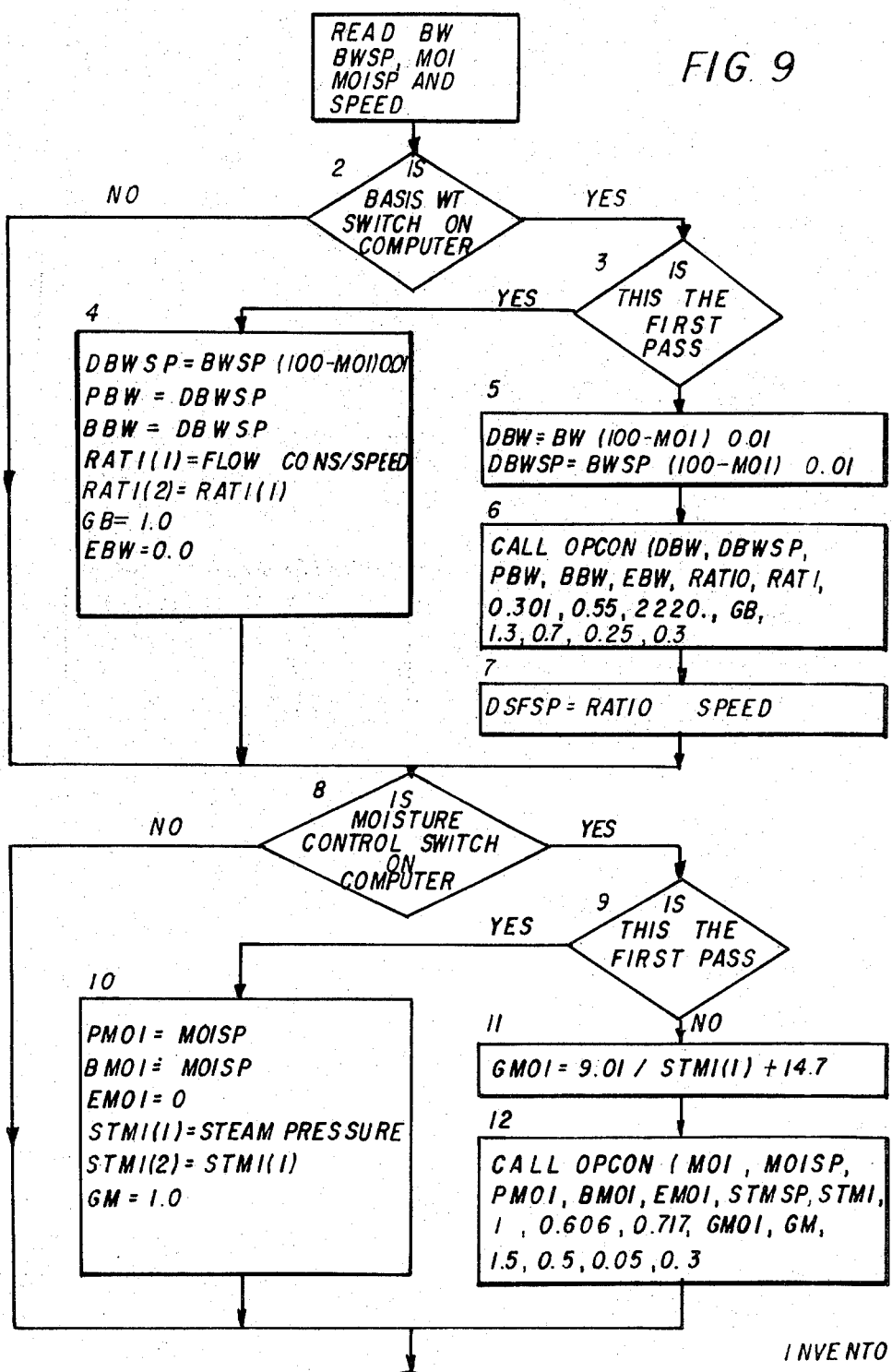
FIG. 9 is a flow chart for a computer program for controlling basis weight and moisture content of paper in a paper manufacturing process.

A program flow chart for the basis weight controller is given in FIG. 9. Referring to FIG. 9, in the basis weight controller operation, the basis weight measurement BW, basis weight setpoint BWSP, the moisture setpoint MOISP and the machine speed are read.

Then a computer switch is tested to determine if the process is under manual or computer control. When the switch is off the process is under manual control and the basis weight program is bypassed. When the switch is on, the process is under computer control and a test is made to determine whether or not this is the first pass. On the first pass the program branches to establish initial conditions to assure bumpless transfer from manual control to computer control. The initial conditions for one example are given in the box 4 in the flow chart of FIG. 9 and one set of values for the constants is given in column B, Table II.

After the first pass, when the initial conditions have been established, the program will read the measured values of basis weight BW and basis weight setpoint BWSP together with the measured values of moisture MOI and moisture setpoint MOISP to determine a dry basis weight DBW and a dry basis weight setpoint DBWSP.

The dry basis weight and dry basis weight setpoint calculated are used in the OPCON control sub-routine to provide the desired output setting RATIO.

This output setting RATIO will be used in the calculation of a dry stock flow setpoint DSFSP which will be used as an input for the dry stock flow controller 51.

TABLE II
GLOSSARY OF TERMS

| A | B | C | D | E |
|---|---|---|---|---|
| OPCON Argument | Basis Weight Controller | Moisture Controller | Variable used in the text | Remark |
| YMESU | DBW | MOI | $Z(k)$ | Measurement |
| YSP | DBWSP | MOISP | $R(k)$ | Setpoint |
| YPRD | PBW | PMOI | $Y(k/k-1)$ | Prediction |
| YBEST | BBW | BMOI | $Y(k/k)$ | Best estimate |
| ERR | EBW | EMOI | $E(k)$ | Error |
| X | RATIO | STMSP | $X(k)$ | Manipulated Variable |
| XI | RATI | STMI | $X(k-1)$ $X(k-2)$ | Previous values of X |
| IDT | 1 | 1 | $\Gamma$ | Dead time factor |
| TAUO | 0.301 | 0.606 | $\eta$ | Function of open loop time constant |
| TAUC | 0.55 | 0.717 | $\theta$ | Function of closed loop time constant |
| GEST | 2220. | GMOI | | Initial estimate of the gain |
| GTUNE | GB | GM | | Tuning parameter for the gain |
| GHI | 1.3 | 1.5 | | Upper limit for GTUNE |
| GLO | 0.7 | 0.5 | | Lower limit for GTUNE |
| GDB | 0.25 | 0.05 | VAR | Dead band of tuner |
| W | 0.3 | 0.3 | W | Weighting factor |

Moisture Controller

After the basis weight control loop operations have been completed, a similar sequence of operations will be performed for the moisture content controller 65 shown in block form in the process control loop for moisture control given in FIG. 10. The moisture controller 65 comprised of the OPCON control sub-routine which directs the digital computer 40 to execute a desired series of operations to read moisture measurements and calculate a setpoint for the analog steam pressure controller 69.

Referring first to FIG. 7, the moisture content of the paper web is controlled by adjusting the pressure of the steam in the dryer cans which comprise the dryer 28. A change in the setting of the steam pressure valve 60 to increase or decrease the steam pressure will cause a change in the drying effect of the dryer 28 to remove correspondingly more or less moisture from the paper web 20 as it passes through the dryer 28. The steam pressure valve setting is regulated directly by an analog controller 69 of which the computer 40 has supervisory control.

The preferred moisture meter 31 for this application is an infrared reflectance meter type such as marketed by General Electric Company under the trademark Inframike II$^R$ and is preferably mounted on a scanning frame together with a beta gauge such as the one mentioned above.

The infrared reflectance meter is moved across the width of the paper web once every sixty seconds enabling it to provide a signal which, for example, may range from approximately 10–50 ma, which signal is proportional to the per cent moisture in the paper. The moisture content may range, for example, from 0–12 percent.

To facilitate sampling, the current output of the infrared moisture meter is converted (for example through the use of a ten ohm precision resistor) into a voltage ranging, for example, from 100–500 MV. The resulting voltage signal is sampled every two seconds, and the sampled outputs provided for each sixty second scan are averaged, providing an average moisture content reading MOI for use by the supervisory digital controller. The average moisture content reading MOI is the controlled variable in the moisture content control loop.

Responsive to each moisture content reading provided, the digital computer 40 determines the difference between the existing steam pressure setpoint STMSP and the setpoint required to provide the desired moisture content for the paper web or sheet 20, and provides a pulse train, the number of pulses of which represent this difference. The pulses are used to operate a stepping motor 61 which moves the setpoint of the analog controller 69 controlling steam pressure in the dryer cans. The steam valve 60 then is moved accordingly by the analog controller 69.

In moisture control, it is difficult to predict the gain K for a controller since the process dynamics relating the steam pressure and the moisture content cannot be determined analytically. However, in accordance with the adaptive features of the controller program, provided by the present invention, the controller gain K can be estimated at a reasonable initial value and the moisture control loop can be tuned under computer control using the OPCON control program.

Referring to FIG. 10, the input EMOI to the moisture congroller 65 is the difference between the value of the moisture setpoint MOISP and the value of the moisture measurement MOI.

Responsive to the error input EMOI, the moisture controller 65 outputs a setting STMSP for the steam pressure will effect a corresponding change in the dryness of the paper coming from dryer 28 and thereby bring the value of the moisture measurement MOI into agreement with the setpoint MOISP.

Assuming that the drying efficiency, defined as the additional moisture removal per unit pressure increase, is inversely proportional to the present steam pressure, the following relationship can be obtained:

moisture change/pressure change = − (constant)/steam pressure (psia)

For one paper manufacturing machine a typical value for the constant was nine.

Moisture control is similar to the basis weight control described in the foregoing with reference to the flow chart given in FIG. 9, with the exception that different parameter values are used, therefore, the arguments of the FORTRAN sub-routine OPCON are different.

The values of the various constants for one example are given in column C of TABLE II, and the initial conditions are given in box 10 of the flow chart of FIG. 9.

Summary

From the foregoing description, it is apparent that the present invention has provided a method and apparatus for an adaptive controller for use in a control process which effects ordered changes in a manipulated process variable in response to measured changes in controlled process variables. The adaptive controller employs an optimal filtering technique wherein a weighted average of a predicted value for the true state of the controlled variable obtained from a process model and a measured value of the controlled process variable are used as the input to a process controller to effect adjustment of the manipulated process variable. Thus, the controller is enabled to respond to changes caused by process upsets but in substantially insensitive to measurement noise.

Compensation for changes in process behavior is effected by adjusting the process model which provides the predicted value for the controlled process variable. Consequently, the controller is self-adaptive and the process can be reidentified while the process is under closed loop control.

Thus, by this self-compensating feature, realized through the adjustment of the process model, the adaptive controller of the present invention is more readily adaptable for use in many different types of processes without the need for initially providing a detailed model which defines the functional relationship between a controlled process variable and a manipulated process variable in the process control loop.

What is claimed is:

1. In a closed loop process control system for a process, the method of controlling process apparatus to maintain a controlled process variable (Y) at a predetermined value, said method comprising the steps of providing information in a stored mathematical model representing a functional relationship between said controlled variable (Y) and a manipulated process variable (X), deriving a predicted value ($Y(k/k-1)$) for the controlled variable from said mathematical model, obtaining measurements of the value of the controlled variable at periodic sampling intervals, deriving an estimated value ($Y(k/k)$) for said controlled variable from the predicted value and a measured value ($k$) of said controlled variable, calculating an adjusted value ($X(k)$) for said manipulated variable using the estimated value of said controlled variable, and adjusting the value of said manipulated variable to correspond to said adjusted value and thereby effect a corresponding change in the value of said controlled variable.

2. The method as set forth in claim 1 including the further step of adjusting the mathematical model at the time of deriving the estimated value ($Y(k/k)$) using the predicted value ($Y(k/k-1)$) last derived from the mathematical model and the estimated value ($Y(k/k)$) last derived to compensate for changes in operating conditions of the process.

3. The method as set forth in claim 2 wherein adjusting the mathematical model includes the steps of comparing the last predicted value ($Y(k/k-1)$) to a previous estimated value ($Y(k-1/k-1)$) which was derived from a preceding measurement ($Z(k-1)$) and adjusting the mathematical model whenever the last predicted value differs from the previous estimated value by more than a predetermined amount.

4. The method as set forth in claim 3, wherein the last predicted value ($Y(k/k-1)$) of the controlled variable is adjusted towards the last derived estimated value ($Y(k/k)$) of the controlled variable whenever the mathematical model is adjusted.

5. The method as set forth in claim 1, wherein the estimated value ($Y(k/k)$) for the controlled variable (Y) is defined by the relationship:

$Y(k/k) = Y(k/k-1) + W[Z(k) - Y(k/k-1)]$ where $Y(k/k-1)$ is the predicted value for the controlled variable $Z(k)$ is the measured value for the controlled variable, and W is a noise weighting factor.

6. The method as set forth in claim 1, wherein calculating the adjusted value ($X(k)$) for said manipulated variable (X) includes the step of comparing the estimated value ($Y(k/k)$) to a desired set point value ($R(k)$) for the controlled variable (Y) to obtain a set point error value ($E(k)$) representing the difference between said estimated value and said set point value.

7. The method as set forth in claim 6, wherein calculating the adjusted value ($X(k)$) for said manipulated variable (X) includes the step of providing information in a stored process controller representing the functional relationship $X(k) = [(1 - \theta)/K(1-\eta)][E(k) - \eta E(k-1)] + \theta X(k-1) + (1-\theta)X(k-\Gamma-1)$ wherein $E(k)$ is the value for the set point error calculated at the time of deriving the estimated value $Y(k/k)$.

$E(k-1)$ is the value of the set point error calculated at the time of deriving a previous estimated value $Y(k-1/k-1)$ which was derived from a preceding measurement.

$X(k-1)$ is the adjusted value calculated from the previous estimated value $Y(k-1/k-1)$.

$X(k-\Gamma-1)$ is the value of $X(k)$ calculated ($\Gamma+1$) measurements ago.

K is the gain of the process controller, and $\eta$ and $\theta$ are exponential functions of the open and closed loop time constants respectively, of the process control system.

8. The method as set forth in claim 1, wherein said mathematical model stores information representing the functional relationship:

$Y(k/k-1) + Y(k-1/k-1) + K(1-\eta)\Delta X(k-\Gamma-1) + \eta Y(k-1/k-1) + Y(k-2/k-2)\eta$ wherein $Y(k/k-1)$ is the predicted value for the controlled variable last derived from the mathematical model.

$Y(k-1/k-1)$ is a previous estimated value for the controlled variable derived at the time the last predicted value was derived.

$Y(k-2/k-2)$ is a further previous estimated value for the controlled variable derived prior to the time of deriving the last predicted value.

$\Delta X(k-\Gamma-1)$ is the difference between successive values of the manipulated variable calculated prior to the time of deriving the last predicted value.

$\Gamma$ is a dead time factor.

K is the gain of the mathematical process model, and $\eta$ is an exponential function of the open loop time constant of the process control system.

9. In a process control system for a process, measuring means for measuring a controlled process variable and providing signals representing a measured value of the controlled variable, means for storing data representing a predicted value for said controlled variable, process apparatus for controlling the value of said controlled variable as a function of the set point of said process apparatus, and process controller means responsive to said signals for controlling said process apparatus to compensate for changes in the value of said controlled variable caused by process upsets, said process controller means comprising signal processing means programmed to provide further signals from said stored data representing a predicted value and to calculate an adjusted set point value for said process apparatus from a weighted average of the predicted and measured values of said controlled variable represented by said signals.

10. In a closed loop process control system for a process, measuring means for measuring the value of a controlled process variable (Y) and providing first output signals representing the value ($Z(k)$) of said controlled variable, system control means responsive to said first output signals for maintaining said controlled variable (Y) at a predetermined value ($R(k)$) by adjusting the value of a manipulated process variable (X) to effect a corresponding adjustment in the value of said controlled variable deviates from said predetermined value, said system control means comprising mathematical model means storing information for establishing a reference value for said controlled process variable and providing second output signals representing a predicted value ($Y(k/k-1)$) for said controlled variable, filter means responsive to said first and second output signals to provide third output signals representing an estimated value ($Y(k/k)$) for said controlled process variable and controller means responsive to said third output signals to calculate an adjusted value ($X(k)$) for said manipulated variable.

11. In a paper manufacturing process, process apparatus for manufacturing a continuous paper sheet having a predetermined weight, measuring means for measuring the weight of said paper and providing first output signals representing the weight ($Z(k)$) of said paper sheet, system control means including mathematical process model means storing information for establishing a reference value for the weight of said paper sheet and for providing second output signals representing a predicted value ($Y(k/k-1)$) for the weight of said paper sheet, filter means responsive to said first and second output signals to provide third output signals representing an estimated value ($Y(k/k)$) for the weight of said paper sheet, and controller means responsive to said third output signals for providing control signals to said process apparatus for effecting adjustment of the weight value of said paper sheet whenever the measured value of the weight of said paper sheet deviates from said desired value.

12. System control means as set forth in claim 11, wherein said mathematical process model means includes logic means for comparing the second output signals representing said predicted value ($Y(k/k-1)$) with the third output signals representing said estimated value ($Y(k/k)$) and effecting adjustment of a predicted value toward said estimated value.

13. In a paper manufacturing process, apparatus for manufacturing a continuous sheet of paper from liquid stock, measuring means for measuring the weight of said paper sheet and providing first output signals representing the measured value of the weight of said paper sheet, valve means for controlling the flow rate of said liquid stock to said apparatus as a function of the set point of said valve means to establish a predetermined weight for said paper sheet, and system control means including mathematical process model means for providing second output signals representing a predicted value for the dry basis weight of said paper sheet, filter means responsive to said first and second output signals for providing third output signals representing an estimated value for said dry basis weight, controller means responsive to said third output signals to provide fourth output signals representing an adjusted set point value for the stock flow valve means, and output means responsive to said fourth output signals to provide control signals for said stock flow means for adjusting the set point of said stock flow valve means whenever the measured value of the dry basis weight deviates from a desired value due to a process upset.

14. In a paper manufacturing process, apparatus for manufacturing a continuous sheet of paper from liquid stock including head box means for containing liquid stock and for depositing said liquid stock on conveyor means in a continuous paper web, measuring means for measuring the basis weight and moisture content of said paper web to provide first output signals representing a measured value of the dry basis weight of said paper web, stock flow valve means for controlling the flow rate of liquid stock through said head box means as a function of the set point of said stock flow valve means to thereby control the basis weight of said paper web, and system control means comprising mathematical process model means for providing second output signals representing a predicted value for the dry basis weight of said paper web, filter means responsive to said first and second output signals for providing third output signals representing an estimated value for said dry basis weight of said paper web, and controller means responsive to said third output signals for computing an adjusted set point value for said stock flow valve means to provide control signals for said stock flow valve means for adjusting the set point of said stock flow valve means whenever the measured value of the dry basis weight deviates from a desired value due to a process upset.

15. In a paper manufacturing process, apparatus for manufacturing a continuous sheet of paper from liquid stock including head box means for containing liquid stock and for depositing said liquid stock on conveyor means in a continuous web, dryer means for removing moisture from said paper web as said paper web is moved by said conveyor means from said head box means to take-up reel means, steam valve means for regulating the drying process of said dryer means, measuring means for measuring the moisture content of said paper web to provide first output signals representing the measured value of the moisture content of said paper web, and system control means comprising mathematical process model means for providing second output signals representing a predicted value for the moisture content of said paper web, filter means responsive to said first and second output signals for providing third output signals representing an estimated value for the moisture content of said paper web, and controller means responsive to said third output signals for calculating an adjusted set point value for said steam valve means to provide control signals to said steam valve means for adjusting the set point of said steam valve means whenever the measured value of the moisture content of said paper sheet deviates from a desired value due to a process upset.

16. In a paper manufacturing process, apparatus for manufacturing a continuous sheet of paper from liquid stock, valve means for providing liquid stock to said apparatus at a predetermined flow rate, drying means for removing moisture from said paper sheet at a predetermined drying rate, measuring means for providing measurements of the basis weight and the moisture content of said paper sheet, and system control means including basis weight controller means for deriving from said measurements a first estimated value for the dry basis weight of said paper and comparing said first estimated value to a dry stock flow set point to provide control signals for said valve means for adjusting the flow rate of said liquid stock whenever the dry basis weight of said paper sheet deviates from a desired weight, and moisture controller means for deriving from said measurements a second estimated value for the moisture content of said paper sheet and comparing said second estimated value to a moisture content set point to provide further control signals for said drying means for adjusting the drying rate of said drying means whenever the moisture content of said paper sheet deviates from a desired amount.

17. In a paper manufacturing process for manufacturing a continuous paper sheet from liquid stock, a closed loop process control system comprising dry stock flow controller means connected in a first control loop for comparing a value of dry stock flow to a dry stock flow set point and calculating an adjusted value for a set point for a stock flow valve whenever the dry stock flow differs from the dry stock flow set point, and basis weight controller means connected in a second control loop which includes said first control loop for comparing a value for the dry basis weight of said paper sheet obtained from measurements to a dry basis weight set point and calculating an adjusted value for the dry stock flow set point for said dry stock flow controller means whenever the dry basis weight differs from the dry basis weight set point.

18. In a paper manufacturing process for manufacturing a continous paper sheet the method of controlling process apparatus to maintain the weight of said paper sheet at a predetermined value, said method comprising the steps of deriving a value of the dry basis weight of said paper sheet from measured values of the basis weight and the moisture content of said paper sheet, calculating a dry stock flow set point using the derived value for said dry basis weight, calculating the dry stock flow rate, comparing the dry stock flow set point to the dry stock flow rate, calculating an adjusted value for the set point of valve means of said process apparatus whenever the difference between the dry stock flow set point and the dry stock flow rate exceeds a predetermined amount, and providing control signals to said process apparatus for changing the set point of said valve means to said adjusted value.

19. The method as set forth in claim 18, wherein calculating the dry stock flow set point includes providing the functional relationship between the dry basis weight and the dry stock flow set point in a stored mathematical model, deriving a predicted value for the dry basis weight from said mathematical model, calculating an estimated value for the dry basis weight from said predicted value and the dry basis weight value obtained by said measurements, and using said estimated value to calculate said dry stock flow set point.

20. In a paper manufacturing process for manufacturing a continuous sheet of paper, the method of controlling process apparatus to maintain the weight of said paper sheet at a predetermined value, said method comprising the steps of establishing in a stored mathematical model the functional relationship between the weight of said paper sheet and a set point ($R(k)$) for a control valve of said process apparatus, deriving a predicted value ($Y(k/k-1)$) for the weight of said paper sheet from said mathematical model, deriving an estimated value ($Y(k/k)$) for the weight of said paper sheet from the predicted value and a measured value ($Z(k)$) for the weight of said paper sheet obtained from a measurement, calculating an adjusted value ($X(k)$) for the set point for said valve means using said estimated value to obtain the set point required for said valve means to provide a desired weight for said paper sheet, and providing control signals for said process apparatus for changing the set point of said valve means to said adjusted value.

21. The method as set forth in claim 20, which includes a further step of adjusting the mathematical model at the time of deriving the estimated value, including comparing the predicted value ($Y(k/k-1)$) last derived from the mathematical model to a previous estimated value ($Y(k-1/k-1)$) which was derived from a preceding measurement, and adjusting the mathematical model whenever the last predicted value ($Y(k/k-1)$) is less than or greater than the previous estimated value ($Y(k-1/k-1)$) by a predetermined amount.

22. The method as set forth in claim 21, wherein the resultant adapting of the mathematical model includes adjusting the last predicted value ($Y(k/k-1)$) towards the last derived estimated value ($Y(k/k)$).

23. The method as set forth in claim 22, wherein the mathematical model is characterized by a predetermined gain (G) and wherein the gain of said mathematical model is adjusted as a function of the value of the last predicted value ($Y(k/k-1)$) relative to the value of the last estimated value ($Y(k/k)$).

24. The method as set forth in claim 23, wherein the gain of the mathematical model is increased whenever the last predicted value ($Y(k/k-1)$) is less than the last estimated value ($Y(k/k)$) and the gain of the mathematical model is decreased whenever the last predicted value ($Y(k/k-1)$) is greater than the last estimated value ($Y(k/k)$) such that with each gain change a future predicted value ($Y(k+1/k)$) derived from the stored mathematical model will approach the estimated value.

25. The method as set forth in claim 23, wherein the adjustment of said mathematical model includes calculating a gain factor and adjusting the gain in predetermined increments of said gain factor.

26. The method as set forth in claim 25, wherein the gain of said mathematical model is adjusted in increments of two per cent of the gain factor.

27. The method as set forth in claim 25, wherein the gain is adjusted within predetermined limits.

28. The method as set forth in claim 21, wherein the derivation of the last estimated value ($Y(k/k)$) for the weight of the paper sheet includes calculating a weighted average of the last predicted value ($Y(k/k-1)$) and the measured value ($Z(k)$) of the weight of said paper sheet.

* * * * *